Dec. 30, 1952 E. KAMPEL 2,623,290
LINE HOLDING CLIP FOR BRICKLAYING
Filed June 21, 1950
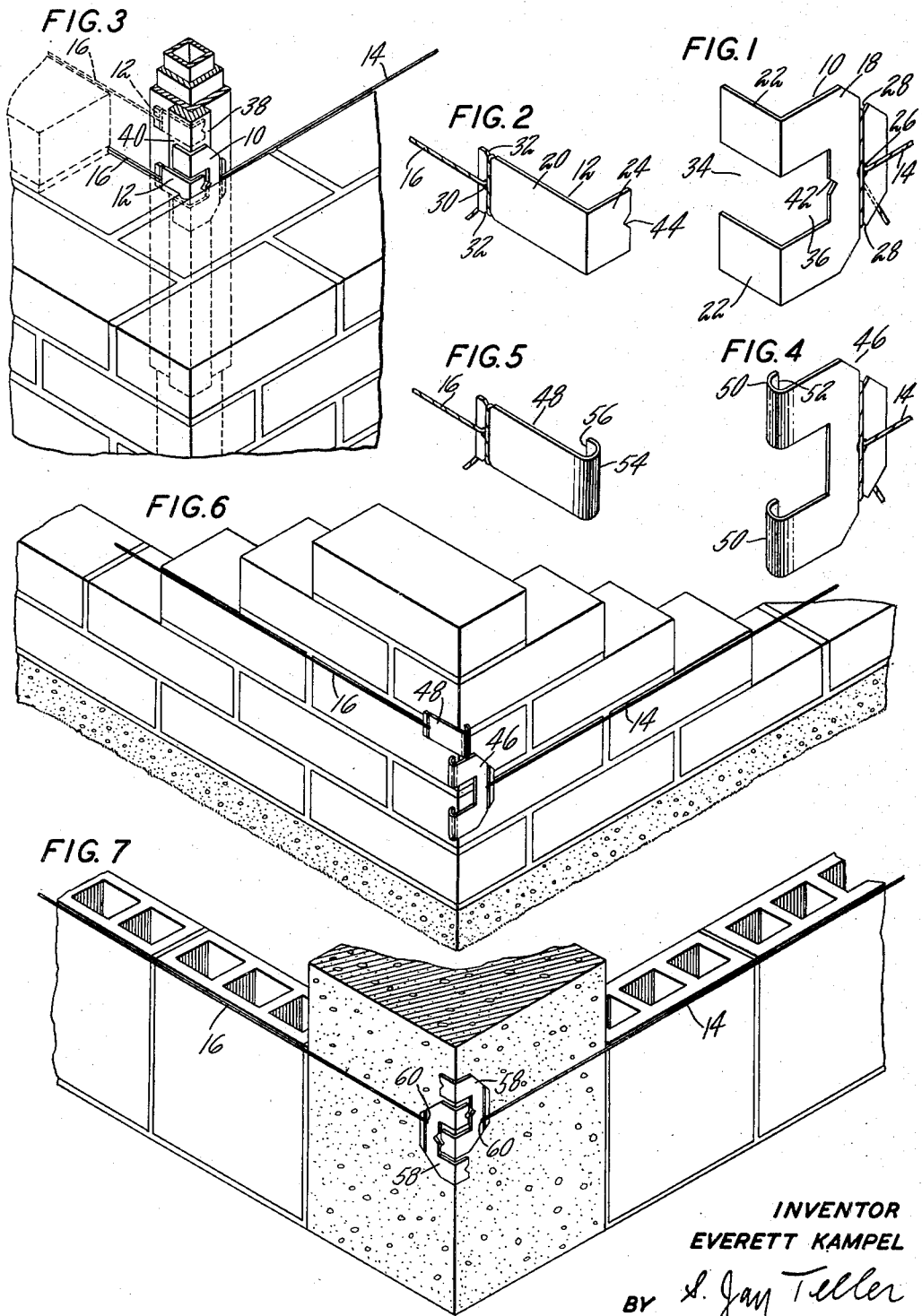
INVENTOR
EVERETT KAMPEL
BY S. Jay Teller
ATTORNEY Patented Dec. 30, 1952

2,623,290

UNITED STATES PATENT OFFICE 2,623,290

LINE HOLDING CLIP FOR BRICKLAYING

Everett Kampel, Hartford, Conn.

Application June 21, 1950, Serial No. 169,332

9 Claims. (Cl. 33—85)

This application is a continuation-in-part of my copending application Serial No. 105,414, filed July 18, 1949, for Guide Line Supporting Apparatus for Brick Laying.

The invention relates to two companion clips adapted to hold two horizontal lines at an angle to each other for guiding the laying of brick or other masonry block units along two wall faces parallel to the said guide lines. While the clips are adapted for use with various types of masonry units, they are particularly adapted for use with brick. For convenience and for brevity of expression the term "brick" will be herein used in a generic sense. The term is to be understood as including other masonry units such as cast stone, concrete or cinder-concrete blocks, glass blocks and hollow tile.

In the laying of brick along two wall faces at opposite sides of a corner it is frequently desirable or necessary to employ two workmen or two groups of workmen at the respective wall faces. As the work progresses and as successive courses are laid it is necessary to successively raise the respective guide lines. It is desirable for the portions of the wall at the two sides of the corner to be maintained at approximately the same level, and it is therefore frequently desirable or necessary for the two guide lines to be at the same level. However by reason of various incidental factors the workmen or the group of workmen at one face may complete a particular course at one side of the corner before the same course is completed at the other side of the corner. It is therefore desirable for the two lines to be independently movable to successively higher levels so that the work at one face will not be delayed on account of a delay at the other face.

For simplicity and for accuracy it is highly desirable to provide a single upright guide at the wall corner, this guide having two intersecting vertical faces. When there is a single upright guide it is impossible with conventional line holding clips to hold the two horizontal guide lines at the same level without encountering interference of one clip with the other.

The general object of the present invention is to provide two companion line holding clips which are so shaped and related that each can engage the corner guide independently of the other even when the two guide lines are at the same level. With clips embodying the invention the two guide lines can be held at the same level or either of them may be moved to another level independently of the other.

A more specific object of the invention is to provide certain details of construction whereby the foregoing more general object is attained.

Other objects of the invention will be apparent from the drawing and from the following specification and claims.

The drawing shows several embodiments of the invention, but it will be understood that various changes may be made from the construction shown, and that the drawing is not to be construed as defining or limiting the scope of the invention, the claims forming a part of this specification being relied upon for that purpose.

Of the drawing:

Figs. 1 and 2 are perspective views of two companion guide line clips embodying the invention.

Fig. 3 is perspective showing the line clips as illustrated in Figs. 1 and 2 positioned for use at the inside corner of a brick wall.

Figs. 4 and 5 are views similar to Figs. 1 and 2 but showing alternative companion guide line clips embodying the invention.

Fig. 6 is a view similar to Fig. 3 but showing the line clips as illustrated in Figs. 4 and 5 positioned for use at the outside corner of a brick wall.

Fig. 7 is a view similar to Fig. 6 but showing other alternative companion guide line clips embodying the invention, which clips are positioned for use at the outside corner of a concrete column so that two walls may be laid at the sides of the column.

Referring to the drawing and more particularly to Figs. 1 to 3 thereof, 10 and 12 are companion clips for holding two horizontal guide lines 14 and 16 for guiding the laying of brick along two parallel wall faces parallel to the said lines. The clips are provided respectively with main portions 18 and 20 constructed for the connection thereto of said guide lines 14 and 16 at predetermined relative positions and the clips are also provided respectively with portions 22 and 24 transversely offset from the portions 18 and 20 for engagement with the vertical faces of a corner guide. While the invention is not so limited, the clips 10 and 12 may advantageously be formed of sheet metal bent to form the said main and offset portions.

The guide lines may be variously connected, but as shown the main portion 18 of the clip 10 has a hole 26 therein and is provided at the top and bottom with notches 28, 28. The line 14 is threaded through the hole 26 from front to rear and is wrapped around the clip to enter the notches 28, 28, the end portion being tucked beneath the line adjacent the hole 26 as shown. Similarly, the main portion 20 of the clip 12 has a hole 30 therein and is provided at the top and bottom with notches 32, 32. The line 16 is connected as described in connection with the cord 14.

One of the clips, as for instance the clip 10, is relatively wide vertically and has an open-ended slot 34 therein which extends throughout the length of the offset portion 22 and into the main portion 18. The portion of the slot extending into the main portion 18 may be regarded as a separate notch this being designated at 36. By reason of the slot 34 the offset portion has two bifurcations which are spaced apart vertically, the said bifurcations being connected with the main portion 18 above and below the notch 36. The other clip, as for instance the clip 12, has at least a section thereof which is relatively narrow vertically and which is of such width that it can be positioned within the slot 34 in the first clip, the said main portion 12 being between the said bifurcations and the said offset portion 24 being within the said notch 36, as shown in Fig. 3. As shown in Fig. 2, the entire clip 12 is relatively narrow vertically but the invention is not so limited.

In use the two guide lines 14 and 16 are held at an angle to each other, ordinarily at an angle of 90°, for guiding the laying of brick along two wall faces parallel to the said lines. The offset portions of two clips are engageable with a suitable corner guide having two adjacent vertical faces at an angle to each other and perpendicular to the faces of the said walls. The corner guide does not of itself constitute a part of the present invention and it may be widely varied. It is essential, however, that the corner guide be so located that the two said vertical faces thereof intersect approximately at the intersection of the planes of the said wall faces.

Fig. 3 shows the clips in use for holding the guide lines in position for guiding the laying of brick along two wall faces at the interior of a wall corner. Other means, not shown, may be provided for holding other lines for guiding the laying of brick along the other exterior wall faces. At an interior corner it is necessary to provide a corner guide separate from the wall to be laid. The details of the separate corner guide may be varied, but Fig. 3 shows a corner guide consisting of a composite upright structure as disclosed in my said copending application. The upright structure need not be described in detail, but it includes a vertical angle bar having adjacent vertical faces 38 and 40 which are parallel to the interior faces of the wall and which intersect approximately at the intersection of the planes of the said wall faces. Actually, the faces 38 and 40 intersect at a vertical line spaced inwardly to a slight extent to provide for the thickness of the clips and to slightly space the guide lines from the wall faces.

The means for connecting the clips with the guide lines, as for instance the holes 26 and 30, are definitely related to the other parts of the clips, the relationship being such that the two guides lines are at the same level when the clip 12 is within the slot in the clip 10. With the particular construction shown, the line 14 is held at the level of the center of the slot 34 and the line 16 is held at the level of the center of the clip 12.

As shown, the width of the slot 34 is substantially greater than the width of the clip 12. In order that the lines may be held at exactly the same level, indicating means are provided for enabling the user to accurately position the two clips in the proper relationship. As shown, there is a small notch 42 at the edge of the notch 36 in the clip 10 and there is a small notch 44 in the end of the offset portion 24 of the clip 12. When the two notches 42 and 44 are in horizontal register, the two guide lines 14 and 16 are at the same level.

The two lines 14 and 16 are held by the clips 10 and 12 as shown and described, it being understood that the opposite ends of the lines are suitably held for vertical adjustment. If desired, clips similar to the clips 12 and 14 may be used for holding the said opposite ends of the lines. The lines are so connected to the clips that they are in tension, the tension in the lines holding the clips in engagement with the vertical faces of the corner guide. The lines have sufficient elasticity to permit the clips to be moved as desired, ordinarily upwardly.

The full lines in Fig. 3 show the clips so engaged with the corner guide that the two guide lines 14 and 16 are at the same level, and as shown the said lines have been used for laying courses of brick at the same level at the two inner faces of the walls. The brick in the courses at opposite sides of the corner can be laid by different workmen. If one course at one level is completed before the other course at the same level the corresponding clip and guide line can be immediately raised without disturbing the other clip and guide line. For instance, if the workman at the left has completed his work and is ready to start another course of brick, he may adjust the clip 12 and the guide line 16 to the next higher position as shown by dotted lines. The clip 10 and the guide line 14 are not disturbed. Similarly, if the workman at the right should complete his work first, he could raise the clip 10 and the guide line 14 to the next higher position, leaving the clip 12 and the guide line 16 undisturbed. It will be clear that the workmen at the two sides of a corner can work independently, it being possible to independently position the two guide lines at any desired different levels or to position them at the same level.

It will be understood that the line 16 when in the position shown by dotted lines is at a level which is above the level of the line 14 by a distance equal to the thickness of a course of brick. Similarly, if the line 14 were raised first it would be at a level which is above the level of the line 16 by a distance equal to the thickness of a course of brick. The bifurcations of the notched clip 10 are sufficiently narrow to permit the other clip to be engaged with the corner guide at a relatively higher level or at a relatively lower level with the difference in level between the two lines equal in either instance to the thickness of a course of brick.

Figs. 4 and 5 show alternative clips 46 and 48 embodying the invention. These clips are or may be similar to the clips 10 and 12 except as to the offset portions thereof. The clip 46 has an offset portion 50 which is bifurcated similarly to the offset portion 22 of the clip 10, but which instead of being straight is curled to provide a vertical edge at 52 which is transversely spaced from the main portion of the clip and which is adapted to engage one of the vertical faces of the guide. Similarly, the clip 48 has an offset portion 54 which is curled to provide a vertical edge at 56 which is transversely spaced from the main portion of the clip and which is adapted to engage one of the vertical faces of the guide.

The clips, as shown in Figs. 4 and 5, may be used with a guide as shown in Fig. 3, but in order to more fully illustrate the utility of the invention the clips are shown in Fig. 6 as used for guiding the laying of brick along two external wall faces at opposite sides of a corner. For external wall faces it is not necessary to provide a separate guide as shown in Fig. 3, and a suitable guide may be provided by building up a "lead" of bricks at the corner, the said lead being carried upward from time to time so as to be kept always above the major portions of the walls to be laid. The front vertical faces at the corner of the brick "lead" constitute vertical guide faces corresponding to the guide faces 38 and 40. The clips 46 and 48 engage the guide faces on the brick "lead" and the manner of use is otherwise the same as that described in connection with Fig. 3. As shown, the clip 48 has been moved to a level above that of the clip 46, but it will be understood that the clips may be at the same level so as to hold the guide lines at the same level. It will be understood that while Fig. 6 illustrates the clips 46 and 48 shown in Figs. 4 and 5, the clips 10 and 12 shown in Figs. 1 and 2 are equally well adapted for use at the exterior corner of a wall.

Fig. 7 shows two identical companion clips 58, 58 which constitute a somewhat different embodiment of the invention. Each clip 58 is or may be closely similar to the clip 10 except the parts are differently proportioned and except that the line connection hole 60 is differently located. The two clips are oppositely positioned. As shown in Fig. 7 each clip has a slot for receiving a section of the main portion of the other clip, and the main portion of each clip has a notch for receiving a section of the offset portion of the other clip. The line connection holes 60, 60 are so located that the two guide lines are at the same level when the clips are positioned as shown.

As shown, and with the guide lines at the same level, the upper bifurcation of the clip at the left is within the slot and notch of the clip at the right, the exact relative positioning of the two clips being determined by the registration of the small notches similar to the notches 42 and 44. The clip at the left can be shifted upwardly so that its lower bifurcation is within the slot and notch of the clip at the right, the exact relative positioning being determined by the registration of the small notches similar to the notches 42 and 44. When the left clip is so shifted, the line 16 at the left is at a level above that of the line 14 at the right, the difference in the levels being equal to the thickness of a course of brick. Subsequently, the guide line 14 at the right can be brought to the same level as that of the guide 16 at the left by shifting the clip at the right upwardly so that the two clips are again in the same relative positions shown in the drawing. It will also be apparent that the clip at the left can be first shifted upwardly by a distance equal to the thickness of a course of brick. When the clip at the right is shifted upwardly from the position shown, neither bifurcation of either clip is within the slot and notch of the other.

Alternatively, either clip can be shifted upwardly to a much greater extent. When so shifted, neither bifurcation of either clip is within the slot and notch of the other. This shifting to a greater extent is necessary when larger masonry units such as hollow tiles are being laid, as illustrated in Fig. 7. A vertical concrete column is shown with walls at the sides thereof which comprise hollow tiles instead of brick. The adjacent front faces of the concrete column constitute vertical guide faces corresponding to the guide faces 38 and 40. The clips 58, 58 engage the guide faces on the concrete column and the manner of use is as previously described.

The invention claimed is:

1. The combination of two companion line holding clips engageable with a corner guide having vertical guide faces intersecting at an exterior corner, one of which clips has a main portion constructed for the connection thereto of a horizontal guide line at a predetermined relative level and also has a portion offset from the main portion for engaging one guide face so as to hold the connected guide line in tension when the said main portion is adjacent the other guide face and the other of which clips has a main portion constructed for the connection thereto of a second horizontal guide line at a predetermined relative level and also has a portion offset from the said main portion for engaging the second said guide face so as to hold the connected guide line in tension when the said main portion is adjacent the first said guide face, the said offset portions of the two clips being at different levels when the clips are positioned to hold the two guide lines at the same level and the said offset portions being thus adapted to respectively engage the first and second said guide faces of the guide independently of each other.

2. The combination of two companion line holding clips engageable with a corner guide having vertical guide faces intersecting at an exterior corner, one of which clips has a main portion constructed for the connection thereto of a horizontal guide line at a predetermined relative level and also has a portion offset from the main portion for engaging one guide face so as to hold the connected guide line in tension when the said main portion is adjacent the other guide face and the other of which clips has a main portion constructed for the connection thereto of a second horizontal guide line at a predetermined relative level and also has a portion offset from the said main portion for engaging the second said guide face so as to hold the connected guide line in tension when the said main portion is adjacent the first said guide face, the main and offset portions of one clip having a slot therein of such width as to receive at least a section of the main and offset portions of the other clip which slot is so positioned that the two offset portions can independently engage the said guide faces of the guide when the clips are positioned to hold the two guide lines at the same level.

3. The combination of two companion clips adapted to hold two horizontal lines at an angle to each other for guiding the laying of brick along two wall faces parallel to the said lines which clips are engageable with a vertical corner guide having two adjacent vertical faces intersecting approximately at the intersection of the planes of the two said wall faces, the said clips respectively having main portions constructed for the connection thereof of the said guide lines at predetermined levels and the said clips also respectively having portions transversely offset from the said main portions for engagement respectively with the said vertical faces of the corner guide so that the two said lines are held in tension, the offset guide engaging portion of one clip being bifurcated with the bifurcations vertically spaced and at least a section of the main portion of the other clip being of such vertical width that it can be positioned between the said bifurcations of the first clip.

4. The combination of two companion clips adapted to hold two horizontal lines at an angle to each other for guiding the laying of brick along two wall faces parallel to the said lines which clips are engageable with a vertical corner guide having two adjacent vertical faces intersecting approximately at the intersection of the planes of the two said wall faces, the said clips respectively having main portions constructed for the connection thereto of the said guide lines at predetermined relative levels and the said clips also respectively having portions transversely offset from the main portions for engagement respectively with the said vertical faces of the corner guide so that the two said lines are held in tension, the main portion of one clip having a notch therein adjacent the offset portion thereof and the offset portion of the same clip being bifurcated with the bifurcations spaced vertically and connected with the main portion above and below the said notch and at least a section of the main portion of the other clip being of such width that it can be positioned between the said bifurcations of the first clip and at least a section of the offset portion of the said other clip being of such size that it can be positioned within the notch in the main portion of the first clip.

5. Two companion clips as set forth in claim 4, wherein the bifurcations of the notched clip are sufficiently narrow vertically to permit the other clip to be engaged with the guide with the two guide lines at levels which differ from each other by the thickness of a course of brick.

6. The combination of a vertically wide line holding clip having a main portion constructed for the connection thereto of a horizontal guide line at a predetermined relative level and having a portion offset from the main portion for engaging a vertical guide face which clip has a slot therein, and a second vertically narrow line holding clip having a main portion constructed for the connection thereto of a second horizontal guide line at a predetermined relative level and having a portion offset from the main portion for engaging another vertical guide face adjacent the first said guide face and at an angle thereto, the second said narrow clip having a width such that it can be positioned within the slot in the first said clip so that the two clips may simultaneously engage the said guide faces when they are positioned to hold the two guide lines at the same level.

7. The combination of two companion clips adapted to hold two horizontal lines at an angle to each other for guiding the laying of brick along two wall faces parallel to the said lines which clips are engageable with a vertical corner guide having two adjacent vertical faces intersecting approximately at the intersection of the planes of the two said wall faces, the said clips respectively having main portions constructed for the connection thereto of the said guide lines at predetermined relative levels and the said clips also respectively having portions transversely offset from the main portions for engagement with the said vertical faces of the corner guide so that the two said lines are held in tension, the main portion of one clip having a notch therein adjacent the offset portion thereof with the center of the notch in horizontal register with the position of the corresponding guide line and the offset portion of the same clip being bifurcated with the bifurcations spaced vertically and connected with the main portion above and below the said notch and the offset portion of the other clip having its center in horizontal register with the position of the corresponding guide line and being of such size that it can be positioned within the notch in the main portion of the first clip and the main portion of the said other clip being of such width that it can be positioned between the said bifurcations of the first clip.

8. Two companion line clips as set forth in claim 7, wherein the width of the notch in one clip and the spacing between the bifurcations thereof are substantially greater than the width of the other clip, and wherein indicating means are provided in the notch of the first clip and at the end of the offset portion of the second clip which indicating means are in horizontal register when the positions of the two guide lines are at the same level.

9. The combination of two companion clips adapted to hold two horizontal lines at an angle to each other for guiding the laying of brick along two wall faces parallel to the said lines which clips are engageable with a vertical corner guide having two adjacent vertical faces intersecting approximately at the intersection of the planes of the two said wall faces, the said clips respectively having similar main portions constructed for the attachment thereto of two guide lines at predetermined relative levels and the said clips also respectively having similar portions offset from the said main portions for engagement respectively with the two said vertical faces of the corner guide so that the two said lines are held in tension, the main portion of each clip having a notch therein adjacent the offset portion thereof with a portion of the notch in horizontal register with the corresponding guide and the offset portion of each clip being bifurcated with the bifurcations spaced vertically and connected with the main portion above and below the notch therein and the bifurcated portions of each clip being of such width that either of them can be positioned in the notch and between the bifurcated portions of the other clip.

EVERETT KAMPEL.

REFERENCES CITED

The following references are of record in the file of this patent:

UNITED STATES PATENTS

| Number | Name | Date |
|---|---|---|
| 363,943 | Bailey | May 31, 1887 |
| 765,250 | McPherson | July 19, 1904 |
| 847,824 | Roberts | Mar. 19, 1907 |
| 1,225,216 | Boyer | May 8, 1917 |
| 1,487,387 | Hurlbutt | Mar. 18, 1924 |
| 2,030,563 | Barnes | Feb. 11, 1936 |

FOREIGN PATENTS

| Number | Country | Date |
|---|---|---|
| 5,493 | Great Britain | Mar. 5, 1898 |
| 10,972 | Great Britain | May 14, 1903 |